United States Patent

[11] 3,615,642

[72] Inventors Geoffrey Ernest Ficken;
Konrad Jerzy Bannert, both of Ilford, England
[21] Appl. No. 683,830
[22] Filed Nov. 17, 1967
[45] Patented Oct. 26, 1971
[73] Assignee Ilford Limited
Ilford, England
[32] Priorities Nov. 28, 1966
[33] Great Britain
[31] 53172/66;
Dec. 19, 1966, Great Britain, No. 56607/66

[54] DYE-SENSITIZED PHOTOGRAPHIC SILVER HALIDE EMULSIONS
2 Claims, No Drawings
[52] U.S. Cl................................................ 96/130, 96/120
[51] Int. Cl.............................................. G03c 1/18
[50] Field of Search.................................. 96/106, 102; 117/34

[56] References Cited
UNITED STATES PATENTS
2,739,149 3/1956 Van Lare..................... 96/106 X
2,778,823 1/1957 Brooker et al................ 96/106 x Primary Examiner—William D. Martin
Assistant Examiner—Theodore G. Davis
Attorney—Cushman, Darby & Cushman ABSTRACT: This application describes a trimethincyanine dye of the general formula:

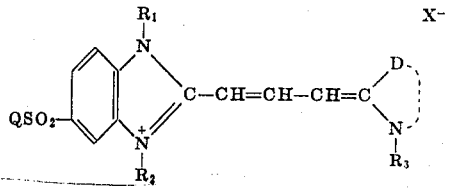

wherein either one of $R_1$ and $R_2$ is an alkyl group and $R_3$ and the other of $R_1$ and $R_2$ is an alkyl, aryl, sulphoalkyl, hydroxyalkyl, alkoxyalkyl, carboxyalkyl, aralkyl or carboxybenzyl group, or an acylsulphamoyl alkyl group of the formula $-(CH_2)_nSO_2NHCOR_{20}$ where $n$ is an integer from one to six and $R_{20}$ is an alkyl group, or an alkyl or aralkyl sulphamoylalkyl group of the formula $-(CH_2)_nSO_2NHR_{21}$ where $n$ is an integer from one to six and $R_{21}$ is an alkyl or aralkyl group, Q is phenyl or phenyl substituted with at least one halogen, alkyl or alkoxy substituent, and D represents the atoms necessary to complete a benzimidazole, benzoxazole, benzothiazole, benzoselenazole or 3H-indole ring, the benzene nucleus in all cases being optionally substituted, and X is an anion.

DYE-SENSITIZED PHOTOGRAPHIC SILVER HALIDE EMULSIONS

This invention relates to new trimethincyanine dyes and to their production and use as sensitizers for silver halide emulsions.

According to the present invention there is provided a trimethincyanine dye of the following general formula I:

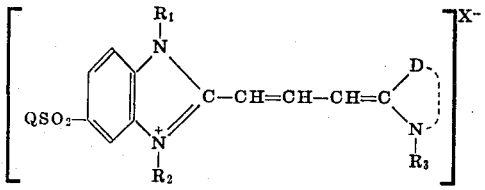

wherein either one of $R_1$ and $R_2$ is an alkyl group and $R_3$ and the other of $R_1$ and $R_2$ is an alkyl, aryl, sulphoalkyl, hydroxyalkyl, alkoxyalkyl, carboxyalkyl, aralkyl or carboxybenzyl group, or an acylsulphamoyl alkyl group of the formula $-(CH_2)_nSO_2NHCOR_{20}$ wherein $n$ is an integer from 1 to 6 and $R_{20}$ is an alkyl group, or an alkyl or aralkyl sulphamoylalkyl group of the formula $-(CH_2)_nSO_2NHR_{21}$ where $n$ is an integer from 1 to 6 and $R_{21}$ is an alkyl or aralkyl group, Q is phenyl or phenyl substituted with at least one halogen, alkyl or alkoxy substituent, and D represents the atoms necessary to complete a benzimidazole, benzoxazole, benzothiazole, benzoselenazole or 3H-indole ring, the benz ring in all cases being optionally substituted, and X is an anion.

Thus when D represents the atoms necessary to complete a benzimidazole residue, a symmetrical or pseudosymmetrical dye may be obtained of the following general formula II:

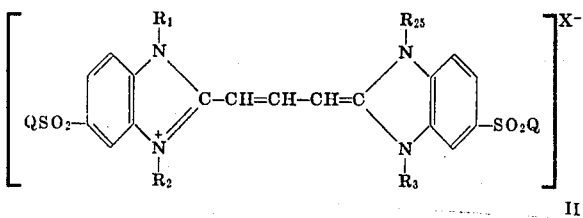

wherein Q and X have the meanings assigned to them in formula I and of the pairs of groups $R_1/R_2$ and $R_3/R_{25}$, one member of each of the said pairs is selected from the following groups: alkyl, aryl, sulphoalkyl, hydroxyalkyl, alkoxyalkyl, carboxyalkyl, aralkyl, carboxybenzyl, an acylsulphamoyl alkyl group of the formula $-(CH_2)_nSO_2NHCOR_{20}$ where $n$ is an integer from 1 to 6 and $R_{20}$ is an alkyl group, or an alkyl or aralkyl sulphamoylalkyl group of the formula $-(CH_2)_nSO_2NHR_{21}$ where $n$ is an integer from 1 to 6 and $R_{21}$ is an alkyl or aralkyl group, the other member of each pair being an alkyl group.

Thus symmetrical dyes of formula II may be obtained wherein $R_2=R_3$ and $R_1=R_{25}$ and pseudosymmetrical dyes may be obtained of the following three types:

i. $R_2=R_3$
$R_1$ $R_{25}$
ii. $R_2$ $R_3$
$R_1$ $R_{25}$
iii. $R_2$ $R_3$
$R_1=R_{25}$ Alternatively when D represents the atoms necessary to complete a benzimidazole residue an unsymmetrical dye may be obtained of the following general formula III:

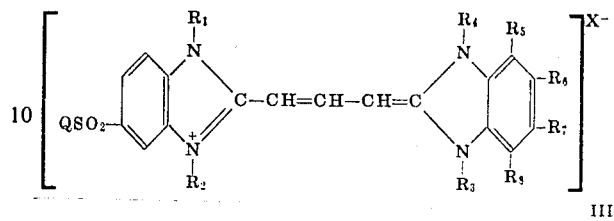

wherein $R_1$, $R_2$, $R_3$, Q and X have the meanings assigned to them above, if $R_3$ is alkyl then $R_4$ is alkyl, aryl, sulphoalkyl, hydroxyalkyl, alkoxyalkyl, carboxyalkyl, aralkyl, carboxybenzyl, an acylsulphamoyl alkyl group of the formula $-(CH_2)_nSO_2NHCOR_{20}$ where $n$ is an integer from 1 to 6 and $R_{20}$ is an alkyl group, or an alkyl or aralkyl sulphamoyl alkyl group of the formula $-(CH_2)_nSO_2NHR_{21}$ where $n$ is an integer from 1 to 6 and $R_{21}$ is an alkyl or aralkyl group, and $R_5$, $R_6$, $R_7$ and $R_8$ may have, for example the groups of values shown in the following table I:

TABLE 1

| $R_5$ | $R_6$ | $R_7$ | $R_8$ |
|---|---|---|---|
| H | H, Cl, Br, F | H, Cl, Br, F | H |
| Cl | H, alkyl | Cl | Cl |
| Cl | Cl | Cl | Cl |
| Br | H, alkyl | Br | Br |
| Br | Br | Br | Br |
| H | H, Cl, Br, F, alkyl, NH$_2$ | CH$_3$ | H |
| H, Cl, Br, F, alkyl, NH$_2$ | H | CF$_3$ | H |
| H | H, Cl, Br, F | CN | H |
| H | CN | H, Cl, Br, F | H |
| H | H, Cl, Br, F | Alkoxycarbonyl | H |
| H | Alkoxycarbonyl | H, Cl, Br, F | H |

Where D represents the atoms necessary to complete a benzoxazole, benzothiazole, benzoselenazole or 3H-indole residue a trimethincyanine may be obtained which has the following general formula IV:

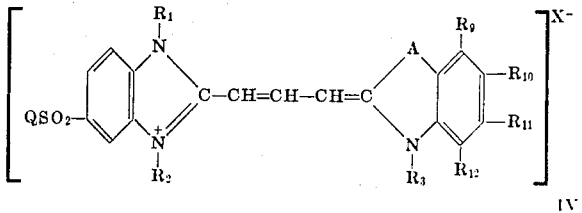

wherein $R_1$, $R_2$, $R_3$, Q and X have the meanings assigned to them in formula I, A is an oxygen, sulphur or selenium atom or a group $CR_{18}R_{19}$ where $R_{18}$ and $R_{19}$ are each lower alkyl, and $R_{10}$ and $R_{11}$ are the same or different and each represents a hydrogen or halogen atom, or an alkyl, aryl or alkoxy group, $R_9$ is a hydrogen atom or together with $R_{10}$ forms part of a benzene ring, $R_{12}$ is a hydrogen atom or together with $R_{11}$ forms part of a fused benzene ring.

By lower alkyl group is meant an alkyl group containing up to six carbon atoms.

When either $R_1$, $R_2$ or $R_3$ is a sulphoalkyl group, i.e., $-(CH_2)_nSO_3H$, where $n$ is an integer from 1 to 6, the dye is usually isolated in the form of the anhydrohydroxide compound.

According to a second feature of the present invention symmetrical dyes of the above formula II are obtained by reacting a quaternary salt of the general formula V:

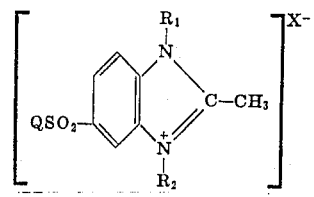

wherein $R_1$, $R_2$, Q and X have the meanings assigned to them in formula I with chloral alcoholate in a basic medium.

According to another feature of the present invention unsymmetrical dyes of the above formula I are obtained by reacting the above quaternary salt of formula V in a basic medium with an intermediate of the general formula VI:

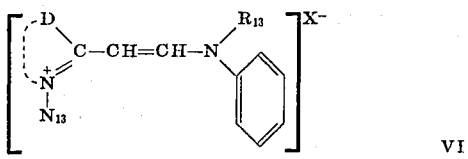

VI wherein $R_{13}$ represents an acyl group such as acetyl or p-toluenesulphonyl, and D and $R_3$ have the meanings assigned to them in formula I or by reacting a quaternary salt of the general formula VII:

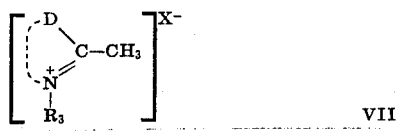

VII with an intermediate of the general formula VIII:

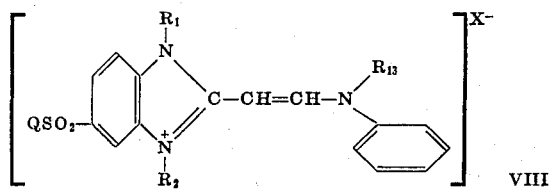

VIII wherein $R_1$, $R_2$, Q and X have the meanings assigned to them in formula I and $R_{13}$ represents an acyl group such as acetyl or p-toluenesulphonyl.

According to a further feature of the present invention unsymmetrical dyes of the above formula II, III or IV are obtained by reacting the above quaternary salt of formula V in a basic medium, with a compound of the general formula IX:

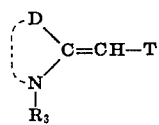

or by reacting the above quaternary salt of formula VII in a basic medium, with a compound of the formula X:

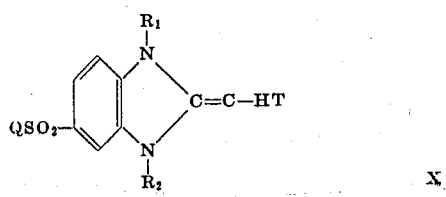

X wherein $R_1$, $R_2$, $R_3$, Q and D have the meanings assigned to them in formula I and T is either —CHO or

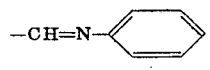

Quaternary salts of formula V are prepared by reaction of a benzimidazole of the formula XI:

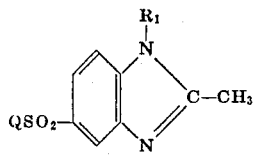

XI with a quaternizing agent $R_2X$ or by reaction of a benzimidazole of the formula XII:

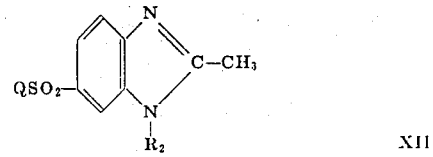

XII with a quaternizing agent $R_1X$, wherein in the above formulae $R_1$, $R_2$ and Q have the meanings assigned to them in formula I. Examples of suitable quaternizing agents are alkyl halides, sulphates or toluene sulphonates, or alkane sultones.

The compound of formula XI where $R_1$ is ethyl and Q is phenyl may be prepared by the following preparation:

1-Ethyl-2-methyl-5-phenylsulphonylbenzimidazole

A mixture of 4-chloro-3-nitrophenyl phenyl sulphone (prepared by the method of Loudon, J. Chem. Soc., 1936, 218) (20g.) anhydrous ethylamine (20 ml.), and ethanol (100 ml.) was heated under pressure at 150° for 6 hours. The solid was filtered off from the cooled mixture, washed with a little ethanol, and dried. The resulting N-ethyl-2-nitro-4-phenyl-sulphonylaniline (15 g.), m.p. 141°–143° was stirred and heated with iron powder (15 g.), ethanol (50 ml.) and water (30 ml.). A mixture of ethanol (5.0 ml.), water(5.0 ml.) and concentrated hydrochloric acid (0.5 ml.) was added, and the mixture was stirred and heated under reflux. After 30 minutes, a further quantity of iron (8 g.) was added, refluxing was continued for 2 hours, the mixture was filtered hot, and the residue washed several times with hot spirit. The combined filtrate and washings were treated with concentrated hydrochloric acid (30 ml.) and evaporated to dryness under reduced pressure. Concentrated hydrochloric acid (55 ml.) and acetic acid (45 ml.) were added, and the mixture was refluxed for 15 hours. After boiling for a few minutes with charcoal, the solution was filtered, cooled, and basified with sodium hydroxide solution. The solid which separated was collected, washed thoroughly with cold water, dried, and extracted (Soxhlet) with benzene. The extracts deposited the benzimidazole which, after crystallization from ethanol had m.p. 214°–216°.

The dyes of the present invention are valuable optical sensitizers for silver halide photographic emulsions, e.g. gelatine silver chloride, bromide, chlorobromide or iodobromide emulsions and for that purpose may be used in sensitizing amounts of the same order as that commonly used in sensitizing such emulsions with cyanine dyes. The invention accordingly includes photographic silver halide emulsions containing one or more of the dyes of formula I in sensitizing amounts.

The following examples will serve to illustrate the invention.

EXAMPLE 1

Bis-(1,3-diethyl-5-phenylsulphonyl-2-benzimidazole)trimethincyanine bromide

A mixture of 1-ethyl-2-methyl-5-phenylsulphonyl-benzimidazole (1.5 g.) and diethyl sulphate (2.7 ml.) was heated at 175° for 3 hours. The cooled melt was dissolved in warm ethanol, dry ether was added, and the precipitated solid was filtered off, washed with ether, and dried. The resulting quaternary salt was dissolved in a warm solution of sodium (0.3 g.) in ethanol (20 ml.), chloral alcoholate (0.5 g.) was added, and the mixture was refluxed for 1 hour. Addition of aqueous sodium bromide solution caused the separation of the dye, which was filtered off, washed with water and dried. Crystallization from ethanol gave purple-red crystals, m.p. 263°–264°.

The dye extends the sensitivity of a silver iodobromide photographic emulsion to 575 nm., with a maximum at 550 nm.

EXAMPLE 2

Bis-(5-p-chlorophenylsulphonyl-1,3-diethyl-2-benzimidazole)trimethincyanine bromide The method of example 1 was followed, but using 5-p-chlorophenylsulphonyl-1-ethyl-2-methylbenzimidazole. The dye was obtained as red-purple crystals, m.p. 278°–279° (decomp.), by crystallization from ethanol.

The dye extends the sensitivity of a silver iodobromide photographic emulsion to 580 nm., with a maximum at 555 nm.

EXAMPLE 3

Bis-(5-p-chlorophenylsulphonyl-1-ethyl-3-2'-methoxyethyl-2-benzimidazole)trimethincyanine iodide A mixture of 5-p-chlorophenylsulphonyl-1-ethyl-2-methylbenzimidazole (1.7 g.) and 2-methoxyethyl p-toluenesulphonate (1.2 g.) was heated at 200° for 5½ hours. The resulting quaternary salt was reacted with a solution of sodium (0.3 g.) in ethanol and chloral alcoholate (0.5 g.) as in example 1. The reaction mixture was poured into an aqueous solution of sodium iodide, and the dye was filtered off, washed with water, dried, and crystallized from methanol. It was obtained as purple-red crystals, m.p. 145°–150°.

The dye extends the sensitivity of a silver iodobromide photographic emulsion to 580 nm., with a maximum at 560 nm.

EXAMPLE 4

Bis-(1-2'-hydroxyethyl-3-methyl-5-p-tolysulphonyl-2-benzimidazole)trimethincyanine iodide A mixture of 1-2'-hydroxyethyl-2-methyl-5-p-tolysulphonylbenzimidazole (1.6 g.) and methyl p-toluenesulphonate (2.0 g.) was heated at 170° for 5 hours. The cooled melt was dissolved in the minimum of ethanol, and the solution treated with dry ether. The quaternary salt which separated was collected, washed with dry ether, dried, and reacted with chloral alcoholate in ethanolic sodium ethoxide solution as in example 1. The dye was isolated by pouring the reaction product into aqueous sodium iodide solution, collected, washed with cold water and ethyl acetate, and dried. It was obtained as red-purple crystals, m.p. 272°–273°, by boiling out with methanol.

EXAMPLE 5

Anhydro-bis-(1-ethyl-5-phenylsulphonyl-3-3'-sulphopropyl-2-benzimidazole)trimethincyanine hydroxide, sodium salt A mixture of 1-ethyl-2-methyl-5-phenylsulphonylbenzimidazole (3.0 g.) and 1,3-propanesultone (3.0 ml.) was heated at 170° for 3 hours, then at 190° for 2 hours. The cooled melt was dissolved in a little ethanol, ethyl acetate was added, and the solid which separated was filtered off, washed with ethyl acetate and dried. This quaternary salt was warmed with a solution of sodium (0.6 g.) in ethanol (20 ml.), chloral alcoholate (1.0 g.) was added, and the mixture was refluxed for 1½ hours. The solid was filtered off after cooling, washed with a 2.5 percent aqueous solution of sodium iodide, then with ethanol, and was finally boiled out with methanol. The dye formed red crystals, m.p. 314°–316°.

The dye extends the sensitivity of a silver iodobromide photographic emulsion to 570 nm., with a maximum at 510 nm.

EXAMPLE 6

Anhydro-bis-(5-p-chlorophenylsulphonyl-1-ethyl-3-4'-sulphobutyl-2benzimidaxole trimethinayanine hydroxide, sodium salt A mixture of 5-p-chlorophenylsulphonyl-1-ethyl-2-methylbenzimidazole (1.7 g.) and 1,4-butanesultone (1.7 ml.) was heated at 170° for 5 hours. The resulting quaternary salt was washed several times with hot ethyl acetate, and then reacted with chloral alcoholate (0.5 g.) and a solution of sodium (0.3 g.) in ethanol, as in example 5. After washing with 2.5 percent aqueous sodium iodide solution and then with ethanol, the dye was obtained as red crystals, m.p. 282°–284° (decomp.).

The dye extends the sensitivity of a silver iodobromide photographic emulsion to 585 nm., with a maximum at 565 nm.

EXAMPLE 7

(5-p-Chlorophenylsulphonyl-1,3-diethyl-2-benzimidazole)(1,3-diethyl-5-trifluoromethyl-2-benzimidazole)trimethincyanine iodide 1,3-Diethyl-2-methyl-5-trifluoromethylbenzimidazolium iodide (1.15 g.) and 5-p-chlorophenylsulphonyl-1,3-idethyl-2-[2-(N-phenyl-p-toluenesulphonamido)-vinyl]-benzimidazolium chloride (1.96 g.) were dissolved in pyridine (12 ml.). Triethylamine (1.0 ml.) was added and the mixture was refluxed for 45 minutes. The dye was precipitated, after cooling, by dilution with ether, was dissolved in methanol (150 ml.) and treated with a 25 percent aqueous sodium iodide solution (12 ml.). After boiling the solution for 5 minutes, the methanol was distilled off, water (60 ml.) was added to the residue, and the dye was extracted with chloroform. After distilling off the solvent, the dye was redissolved in chloroform, filtered, and chromatographed on neutral alumina using chloroform as eluant. The solvent was removed from the eluate, and the dye was crystallized twice from ethanol, forming red crystals, m.p. 258°–260°.

The dye extends the sensitivity of a silver iodobromide photographic emulsion to 575 nm., with a maximum at 550 nm.

The dyes of the following examples 8–17 were prepared using a method similar to that used in example 7:

EXAMPLE 8

(5-p-Chlorophenylsulphonyl-1,3-diethyl-2-benzimidazole)(5-bromo-1,3-diethyl-6-trifluoromethyl-2-benzimidazole)trimethincyanine iodide The dye was obtained as red crystals, m.p. 285°–286°, after crystallization twice from ethanol.

The dye extends the sensitivity of a silver iodobromide photographic emulsion to 575 nm., with a maximum at 550 nm.

EXAMPLE 9

(5-p-Chlorophenylsulphonyl-1,3-diethyl-2-benzimidazole)(1,3-diethyl-5-methyl-6-trifluoromethyl-2-benzimidazole)trimethincyanine iodide The dye was obtained as red crystals, m.p. 178°–180°, by crystallization from ethanol.

The dye extends the sensitivity of a silver iodobromide photographic emulsion to 570 nm., with a maximum at 550 nm.

EXAMPLE 10

(5-p-Chlorophenylsulphonyl-1,3-diethyl-2-benzimidazole)(5-chloro-1,3-diethyl-6-trifluoromethyl-2-benzimidazole)trimethincyanine iodide The dye formed purple-red crystals, m.p. 268°–270°, by crystallization from ethanol.

The dye extends the sensitivity of a silver iodobromide photographic emulsion to 575 nm., with a maximum at 550 nm.

EXAMPLE 11

(5-p-Chlorophenylsulphonyl-1,3-diethyl-2-benzimidazole)(5-cyano-1,3-diethyl-2-benzimidazole) trimethincyanine iodide.

The dye was obtained as olive-red crystals, m.p. 216°–218°, by crystallization from a mixture of methanol and ethanol.

The dye extends the sensitivity of a silver iodobromide photographic emulsion to 590 nm., with a maximum at 565 nm.

EXAMPLE 12

(5-p-Chlorophenysulphonyl-1,3-diethyl-2-bonzimidazole)(1-3'-acetylsulphamoylpropyl-5-chloro-3-ethyl-6- trifluoromethyl-2-benzimidazole)trimethincyanine iodide

THe dye, prepared from 1-3'acetylsulphamol-propyl-5-chloro-3-ethyl-2-methyl-6-trifluoromethylbenzimidazolium bromide, formed olive red crystals, m.p. 236°–238°, by crystallization from ethanol.

The dye extends the sensitivity of a silver iodobromide photographic emulsion to 575 nm., with a maximum at 555 nm.

EXAMPLE 13

(5-p-Chlorophenylsulphonyl-1,3-diethyl-2-benzimidazole)(1-4'-acetylsulphamoylbutyl-5-bromo-3-ethyl-6-trifluoromethyl-2-benzimidazole) trimethincyanine iodide The dye was obtained as greenish-red crystals, m.p. 218°–220°, by crystallization from ethanol.

The dye extends the sensitivity of a silver iodobromide photographic emulsion to 580 nm., with a maximum at 555 nm.

EXAMPLE 14

(5-p-Chlorophenylsulphonyl-1,3-diethyl-2-benzimidazole)(5-bromo-3-ethyl-1-3'-sulphopropyl-6-trifluoromethyl-2-benzimidazole)trimethincyanine iodide THe dye, prepared from anhydro-5-bromo-3-ethyl-2-methyl-1-'-sulphopropyl-6-trifluoromethylbenzimidazolium hydroxide, formed olive-red crystals, m.p. 248°–250°, by crystallization from a mixture of methanol and ethanol.

The dye extends the sensitivity of a silver iodobromide photographic emulsion to 580 nm., with a maximum at 555 nm.

EXAMPLE 15

(5-p-Chlorophenylsulphonyl-1,3-diethyl-2-benzimidazole)(5-chloro-3-ethyl-1-3'-sulphopropyl-6-trifluoromethyl-2-benzimidazole)trimethincyanine iodide.

The dye was obtained as olive-red crystals, m.p. 234°–236°, by crystallization from a mixture of methanol and ethanol.

The dye extends the sensitivity of a silver iodobromide photographic emulsion to 575 nm., with a maximum at 555 nm.

EXAMPLE 16

(5-p-Chlorophenylsulphonyl-1,3-diethyl-2-benzimidazole)(1-ethyl-3-3'-sulphopropyl-5-trifluoromethyl-2-benzimidazole)trimethincyanine iodide The dye was obtained as olive-red crystals, m.p. 254°–256°, by crystallization from a mixture of methanol and ethanol.

The dye extends the sensitivity of a silver iodobromide photographic emulsion to 575 nm., with a maximum at 555 nm.

EXAMPLE 17

(5-p-Chlorophenylsulphonyl-1,3-diethyl-2benzimidazole)(1-ethyl-6-methyl-3-3'-sulphopropyl-5-trifluoromethyl-2-benzimidazole)trimethincyanine iodide The dye was obtained as olive-red crystals, m.p. 247°–249°, by crystallization from a mixture of methanol and ethanol.

The dye extends the sensitivity of a silver iodobromide photographic emulsion to 575 nm., with a maximum at 550 nm.

EXAMPLE 18

(5-p-Chlorophenylsulphonyl-1-ethyl-3-3'-sulphopropyl-2-benzimidazole)(5-chloro-1,3-diethyl-2-benzimidaxole) trimethincyanine iodide The dye was obtained by reaction of anhydro-5-p-chlorophenylsulphonyl-1-ethyl-2-methyl-3-3'-sulphopropyl-benzimidazolium hydroxide with 5-chloro-1,3-diethyl-2[2-(N-phenyl-p-toluenesulphonamido)-vinyl]-benzimidazolium chloride, as in example 7. The dye was obtained as greenish-red crystals, m.p. 248°–250°, by crystallization from ethanol.

The dye extends the sensitivity of a silver iodobromide photographic emulsion to 565 nm., with a maximum at 550 nm.

EXAMPLE 19

(5-p-Chlorophenylsulphonyl-1-ethyl-3-4'-sulphobutyl-2-benzimidazole)(5-p-chlorophenylsulphonyl-1,3-diethyl-2-benzimidazole)trimethincyanine iodide Anhydro-5-p-chlorophenylsulphonyl-1-ethyl-2-methyl-3-4'-sulphobutylbenzimidazolium hydroxide and 5-p-chlorophenylsulphonyl-1,3-diethyl-2-[2-(N-phenyl-p-toluenesulphonamido)-vinyl]-benzimidazolium chloride were reacted together, and the dye was isolated, as in example 7. It was obtained as brown-red crystals, m.p. 267°–269°, by crystallization from a mixture of methanol and chloroform.

The dye extends the sensitivity of a silver iodobromide photographic emulsion to 590 nm., with a maximum at 565 nm.

EXAMPLE 20

(5-p-Chlorophenysulphonyl-1,3-diethyl-2-benzimidazole)(1,3,3,5-tetramethyl-3H-indole-2)trimethincyanine iodide.

A mixture of 5-p-chlorophenylsulphonyl-1,3-diethyl-2-methylbenzimidazolium ethylsulphate (2.45 g.), 1,3,3,5-tetramethyl-2-indolinylideneacetaldehyde (1.1 g.), pyridine (5.0 ml.) and piperidine (0.5 ml.) was refluxed for 4 hours. The tar, which separated when the solution was poured into an aqueous solution of sodium iodide, was taken up in chloroform. The solution was dried and chromatographed on alumina, eluting with chloroform. The elute from the main band was evaporated to small volume and ether was added. The solid which separated was collected and crystallized from ethanol to give the dye as red-purple crystals, m.p. 192°–194°.

THe dye extends the sensitivity of a silver iodobromide photographic emulsion to 585 nm., with a maximum at 550 nm.

EXAMPLE 21

(5-p-Chlorophenylsulphonyl-1,3-diethyl-2benzimidazole)(3-ethyl-2-benzoselenazole)trimethincyanine iodide.

A mixture of 5-p-chlorophenylsulphonyl-1,3-diethyl-2-methylbenzimidazolium ethylsulphate (2.45 g.), 3-ethyl-2-(2-phenyliminoethylidene)-benzoselenazoline (1.6 g.), pyridine (5.0 ml.) and piperidine (0.5 ml.) was refluxed for 3 hours. The resulting solution was poured into aqueous sodium iodide solution, and the tar that separated was washed several times by decantation with water and then dissolved in chloroform. The solution was dried and chromatographed on alumina, eluting with chloroform. The main band was eluted, and the eluate was evaporated to small volume and treated with dry either. The solid that separated was collected, washed with other and crystallized from ethanol to give the dye as red crystals, m.p. 184°–186°.

THe dye extends the sensitivity of a silver iodobromide photographic emulsion to 600 nm., with a maximum at 570 nm.

EXAMPLE 22

Anhydro(5-p-Chlorophenylsulphonyl-1-ethyl-3-4'-sulphobutyl-2-benzimidazole)(3-ethyl-5-phenyl-2-benzoxazole) trimethincyanine hydroxide A mixture of anhydro-5-p-chlorophenylsulphonyl-1-ethyl-3-4'-sulphobutyl-2-methylbenzimidazolium hydroxide (1.45 g.), 3-ethyl-5-phenyl-2-[2-(N-phenylacetamido)-vinyl]-benzoxazolium iodide (1.6 g.), pyridine (5 ml.) and piperidine (0.4 ml.) was refluxed for 3½ hours. The resulting solution was cooled and diluted with ethanol, and the solid which separated was collected and washed successively with ethanol, water, and ethanol. After boiling out with methanol, the dye was obtained as red crystals, m.p. 345°–346° (decomp.).

EXAMPLE 23

Anhydro-bis-(3-carboxymethyl-5-p-chlorophenylsulphonyl-1-ethyl-2-benzimidazole) trimethincyanine hydroxide A mixture of 5-p-chlorophenylsulphonyl-1-ethyl-2-methylbenzimidazole (3.3 g.) and sodium bromoacetate (1.6 g.) was heated at 175° for 5½ hours. The cooled product was refluxed with ethanol for 30 minutes, and a solution of sodium (0.6 g.) in ethanol (25 ml.) was added, followed by the addition of chloral alcoholate (1.0 g.). The mixture was refluxed for 1 hour and then added to aqueous sodium iodide solution. The dye was filtered off, washed with water, dried, and crystallized from ethanol, when it was obtained as purple crystals, m.p. 234°–237° (decomp.).

EXAMPLE 24

Bis-[5-(2,4-dichlorophenyl)-sulphonyl-3-ethyl-1-phenyl-2-benzimidazole] trimethincyanine iodide A mixture of 5-(2,4-dichlorophenyl)-sulphonyl-2-methyl-1-phenylbenzimidazole (2.1 g.) and diethyl sulfate (0.7 ml.) was heated at 160° for 30 minutes. The resulting quaternary salt was warmed with a solution of sodium (0.3 g.) in ethanol (20 ml.), chloral alcoholate (0.5 g.) was added, and the whole refluxed for 1 hour and then added to aqueous sodium iodide solution. The solid which separated was filtered off, washed with water and ether, dried, and boiled with methanol (50 ml.). The solution was filtered, evaporated to small volume and treated with ethanol. The solid which separated on cooling was collected, washed with ethanol and dried, giving the dye as red-purple crystals, m.p. 210°–212°.

We claim as our invention:

1. A dye-sensitized photographic silver halide emulsion which is characterized in that it contains a sensitizing amount of a trimethincyanine sensitizing dye of the formula:

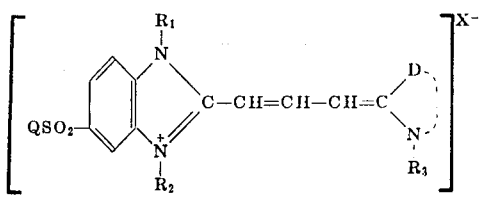

wherein one of $R_1$ and $R_2$ is an alkyl group and $R_3$ and the other of $R_1$ and $R_2$ is selected from the group consisting of alkyl, aryl, sulphoalkyl, hydroxyalkyl, alkoxyalkyl, carboxyalkyl, aralkyl or carboxybenzyl group, or an acylsulphamoyl alkyl group of the formula $-(CH_2)_n SO_2 NHCOR_{20}$ where $n$ is an integer from 1 to 6 and $R_{20}$ is an alkyl group, or an alkyl or aralkyl sulphamoylalkyl group of the formula $-(CH_2)_n SO_2 NHR_{21}$ where $n$ is an integer from 1 to 6 and $R_{21}$ is an alkyl or aralkyl group, Q is phenyl or phenyl substituted with at least one halogen, alkyl or alkoxy substituent, and D represents the atoms necessary to complete a benzimidazole, benzoxazole, benzothiazole, benzoselenazole or 3H-indole ring, the alkyl in all instances being a lower alkyl and the benzene nucleus in all cases being optionally substituted, and X is an anion.

2. A dye-sensitized photographic silver halide emulsion which is characterized in that it contains a sensitizing amount of (5-p-chlorophenylsulphonyl-1-ethyl-3-4'-sulphobutyl-2-benzimidazole) (5-p-chlorophenylsulphonyl-1-3-diethyl-2-benzimidazole) trimethincyanine iodide as the sensitizing dye.

* * * * *